United States Patent [19]
Kita

[11] 4,347,917
[45] Sep. 7, 1982

[54] FLOATING TYPE DISC BRAKE

[75] Inventor: Yasuo Kita, Itami, Japan

[73] Assignee: Sumitomo Electric Industries, Ltd., Osaka, Japan

[21] Appl. No.: 59,702

[22] Filed: Jul. 23, 1979

Related U.S. Application Data

[63] Continuation-in-part of Ser. No. 854,168, Nov. 23, 1977, abandoned.

[30] Foreign Application Priority Data

Dec. 7, 1976 [JP] Japan ............................. 51-147460

[51] Int. Cl.³ .......................................... F16D 65/02
[52] U.S. Cl. ................................. 188/73.45; 188/73.34
[58] Field of Search .................... 188/72.4, 73.3, 73.6, 188/73.43, 73.44, 73.45, 73.34

[56] References Cited

U.S. PATENT DOCUMENTS

| | | | |
|---|---|---|---|
| 3,848,709 | 11/1974 | Tourneur | 188/73.3 |
| 4,022,303 | 5/1977 | Kondo et al. | 188/73.3 |
| 4,042,074 | 8/1977 | Ishihara et al. | 188/73.3 |
| 4,068,743 | 1/1978 | Karasudani et al. | 188/73.3 |
| 4,191,278 | 3/1980 | Karasudani | 188/73.3 |

FOREIGN PATENT DOCUMENTS

| | | | |
|---|---|---|---|
| 2014468 | 10/1970 | Fed. Rep. of Germany | 188/73.3 |
| 2,548,927 | 5/1976 | Fed. Rep. of Germany | 188/73.3 |
| 2,649,843 | 5/1977 | Fed. Rep. of Germany | 188/73.6 |
| 1362688 | 4/1964 | France | 188/73.3 |
| 1500830 | 10/1967 | France | 188/73.6 |

*Primary Examiner*—Edward R. Kazenske
*Attorney, Agent, or Firm*—Sughrue, Mion, Zinn, Macpeak & Seas

[57] ABSTRACT

A floating type of disc brake is constructed with a fixed member which slidably supports a floating caliper member. The fixed member has two pairs of arm portions which span a rotatable disc and are displaced about the periphery thereof on either side of the floating caliper member. The floating caliper member is provided with a hole for receiving a bolt extending in the axial direction of the disc from one pair of the arm portions and a pin slidingly fitted in a guide slot running in the axial direction of the disc in the other pair of arm portions. The pin and guide slot are provided outside the circumference of the disc so that the floating caliper member can be rotated thereabout when the bolt is removed to facilitate replacement of the friction brake pads. The range of sliding movement of the bolt relative to the hole is displaced in the axial direction of the disc from the range of sliding movement of the pin relative to the guide slot. The center of gravity, in the axial direction of the disc, of the floating caliper member is within the range of sliding movement of the bolt relative to the hole so as to minimize the moment exerted on the engaging portion between the stationary member and the floating member due to gravity.

9 Claims, 5 Drawing Figures

FLOATING TYPE DISC BRAKE

This application is a continuation-in-part of copending application Ser. No. 854,168, filed Nov. 23, 1977 and now abandoned.

BACKGROUND OF THE INVENTION

This invention relates to the improvements in a floating type disc brake, wherein a means for pressing pads of a floating type disc brake against a disc is remote from the disc, and more specifically, the center of gravity of a floating member in the axial direction of the disc is remote from the disc.

So far as a moment being exerted on the engaging portion between the stationary member and the floating member due to gravity which is exerted on the center of gravity in the plane of the floating member which is parallel to the disc is concerned, it is preferable from the viewpoint of maintaining the accuracy in the sliding engagement between the stationary member and the floating member to reduce to the minimum the length of a moment arm which is perpendicular with respect to a line connecting the engaging portions between two pairs of members. In this regard, an attempt has been proposed, such as disclosed in U.S. Pat. No. 3,374,866, in which the floating member is guided by a pair of guide pins of a press means which are provided on circumferentially opposite sides of a disc. With this device, however, it has been impossible to replace the friction pads with fresh ones by removing one guide pin and rotating a floating member about the other guide pin.

SUMMARY OF THE INVENTION

It is a primary object of the present invention to provide a floating type disc brake, wherein the center of gravity of a floating member of a disc brake which is remote from the disc surface is received within a wide range of sliding movement in the axial direction of the disc, so that accuracy in the sliding engagement between the floating member and a stationary member may be maintained intact during the service of the disc brake.

It is another object of the present invention to provide a floating type disc brake, wherein the sliding engagement between two pairs of members, such as between a bolt and a hole or between a pin and a guide slot, are staggered from each other in the axial direction of the disc, so that a nominal range of total sliding movement thereof may be increased.

One of the features of the present invention resides in the sliding engagements between two pairs of arms of a stationary member and a pair of arms of the floating member are accomplished by the engagement of a bolt with a hole and by the engagement of a pin with a guide slot. According to the present invention, the engagement between the pin and the guide slot is provided outside the circumference of a disc, so that a floating member may be rotated thereabout. With this arrangement, replacement of friction pads with fresh ones is achieved with ease by removing the bolt from the one hole. In addition, a reduction in length of a moment arm is achieved by locating the center of gravity of the floating member, in the axial direction of the disc, within the sliding range of the bolt relative to the hole. There is provided according to the present invention, a floating type disc brake, wherein a considerably weighty floating member may be retained by a stationary member in a manner to be guided in the axial direction of the disc as well as in the direction of a plane parallel to the disc surface, and replacement of friction pads with fresh ones is facilitated.

BRIEF DESCRIPTION OF THE DRAWINGS

Reference will be had to preferred embodiments of the present invention in conjunction with the accompanying drawings, wherein.

DETAILED DESCRIPTION OF THE INVENTION

Figure 1:
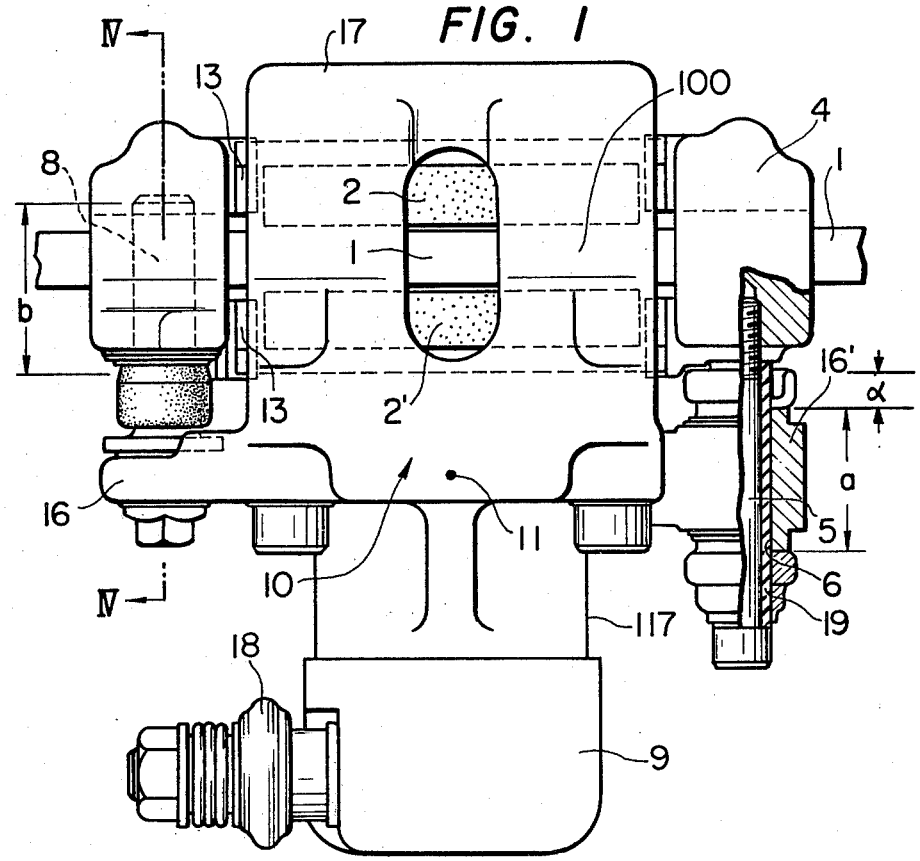
FIG. 1 is a plan view.
Figure 2:
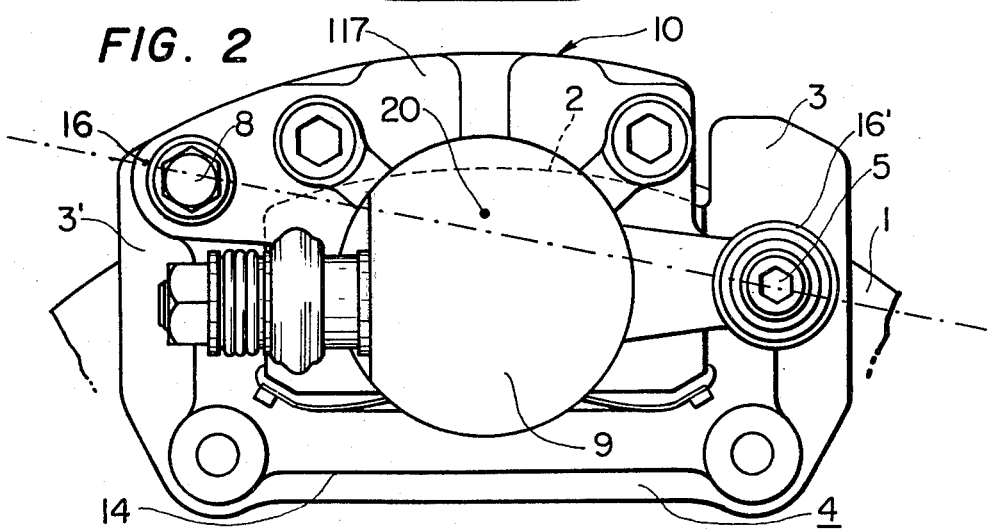
FIG. 2 is a bottom view of FIG. 1.
Figure 3:
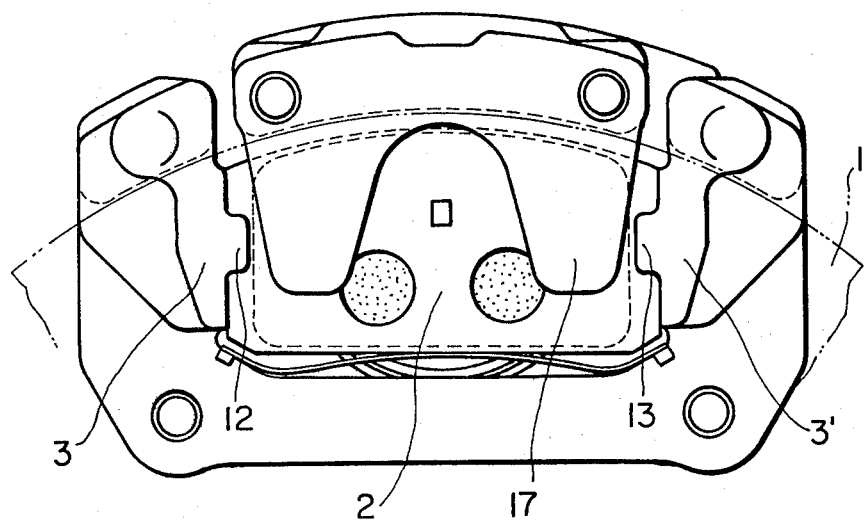
FIG. 3 is a top plan view of FIG. 1.
Figure 4:
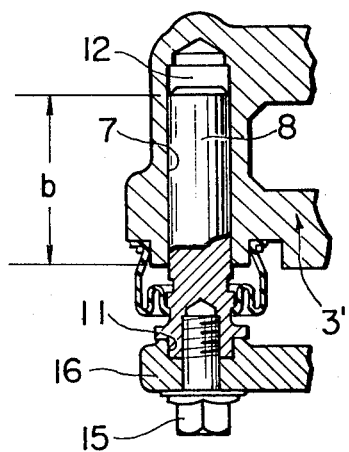
FIG. 4 is a cross sectional view taken along the line IV—IV of FIG. 1.
Figure 5:
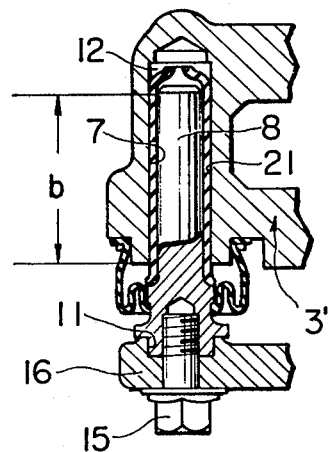
FIG. 5 is a cross sectional view showing another embodiment, which corresponds to FIG. 4.

Referring to FIGS. 1 to 3, there is shown a disc brake of the type in which a friction pad 2 and a friction pad 2' disposed on opposite sides of a disc 1 are guided along the opposing side faces of a stationary member 4. The stationary member 4 has two pairs of U-shaped arm portions 3 and 3' which are circumferentially displaced from each other and span two portions of the disc 1, each respective arm portions having ledges 13 adapted to be slidingly fitted in groove 12 provided in the opposite side surfaces of lining plates of the friction pads 2 and 2'. The two pairs of arm portions are substantially the mirror-image of each other. These two pairs of arm portions are connected by a beam 14 on one side of the disc, as seen in FIG. 2, thereby presenting a U-shape as viewed in the axial direction of disc, but remain separate at respective arm ends on the other side of disc as seen in FIG. 3. However, these arm ends can be and are preferably connected to each other from the viewpoint of strength. One arm portion 3' is provided, in a portion beyond the outer periphery of the disc, with a guide slot 7 running in the axial direction of the disc, as seen in FIG. 4 or 5. A pin 8 is bolted as at 15 to one flange 16 of a floating caliper member 10 in a manner to be slidingly fitted in the aforesaid guide slot. The invention relating thereto is disclosed in U.S. application Ser. No. 710,046, filed on July 30, 1976, now U.S. Pat. No. 4,042,074, corresponding to Japanese Utility Model Application No. 41021/1976, and assigned to the assignee of this application.

Floating caliper member 10 has a pair of arms. The outside arm portion 17 thereof is connected to the inside portion 117 through a bridge section 100 which spans the outer periphery of the disc. The inside portion 117 has a press means 9 so arranged that pad 2' is mechanically pressed against the disc 1 by the force of a known lever 18 (shown with the extended portion omitted) produce by the stroke thereof, and the resultant reacting force acts on the floating member 10 to shift the same downwards, as viewed in FIG. 1, whereby other pad 2 is pressed against the disc 1 by the arm 17. The press means 9 may alternatively consist of a known assembly of piston and cylinder which is actuated by an internal liquid pressure. In case of a floating caliper member equipped with a mechanically actuated press means or the so-called fail-safe type press means in which the spring biasing operation is controlled by a liquid pressure, the center of gravity exists at a point shown as at 11 in FIG. 1, which point is considerably remote from the disc. Should the floating caliper member also be equipped on the right side thereof with a mechanism so arranged as to be slidingly guided within the range b shown on the left side in FIG. 1, and should the floating member be guided by these mechanisms alone, the engagement between the pin 8 and the guide slot 7 would bind as a result of a moment due to gravity. With the embodiment shown, the right flange 16' of floating caliper member 10, as shown in FIGS. 1 and 2, is connected to the arms connected to press means 9 and extending rightwards, and the floating caliper member is supported slidably in the axial direction of the disc 1 within a range a by a bolt 5 passing through a hole 6 running through the flange 16' and a sleeve 19 surrounding the bolt. Should the floating caliper member also be equipped on both sides thereof with a supporting mechanism having a range of sliding movement a, there is a difficulty in the replacement of the friction pads with fresh ones, because it is impossible to remove the one bolt 5 and to rotate the floating member about a similar bolt on the left side. In contrast thereto, the construction according to the present invention, as is apparent from FIG. 2, permits the right belt 5 to be unscrewed from the arm portion 3, and the floating caliper member 10 is rotated about the left pin 8, whereby replacement of friction pads with fresh ones is readily achieved. Furthermore, as is apparent from FIG. 1, the range of sliding movement b on the left side is staggered from the range of sliding movement a on the right side by a distance α, so that the nominal range of total sliding movement is increased by that distance α. This desirably provides an improved accuracy in guiding the floating caliper member as well as increasing the durability for the floating member. The center of gravity 20 of the floating caliper member on the plane shown in FIG. 2 exists on the plane including pin 8 (see FIG. 1) and bolt 5, or in the vicinity thereof, and/or nearly in the mid portion between the pin 8 and the bolt 5, so that there is avoided the distortion in engagement between the pin or bolt and the guide slot or hole, which might be caused by moments of various forces. Further, since, as shown in FIG. 1, the center of gravity of the caliper in the axial direction of the disc is located within the range of sliding movement a, the bolt 5 will support a major portion of the weight of the caliper and undesirable moment forces are minimized.

As is apparent from the foregoing, although the floating caliper member is slidingly guided by a pin as in the prior art device, the present invention features both a pin 8 and a bolt 5 which are different in function from each other and are provided on the left and right arm portions 3' and 3, respectively, so that the floating member 10 may be guided, by sliding the pin 8 on the one arm portion 3' within the guide slot 7 provided in the stationary member 4 which spans the circumferential portion of the disc in the outer peripheral portion of the disc, and by extending the other arm portion away from the disc within the circumference of the disc, preferably in a manner to sandwich the press means 9 in mirror-image relation with respect thereto.

The difficulty in providing the machining precision for pitches or parallelism between the pin or bolt and the guide slot or hole may be compensated for by covering the pin 8 with a rubber tube 21 over the sliding portion thereof relative to the guide slot 7 as shown in FIG. 5, or employing the sleeve 19 uneven in wall thickness (such as by making the inner peripheral circle in cross section eccentric with respect to the outer peripheral circle in cross section) as shown in FIG. 1. The present invention is not limited to the embodiments shown, and changes and modifications may be made without departing the spirit of the invention and within the scope of the appended claims.

What is claimed is:

1. In a floating disc brake of the type having a fixed member having two pairs of arm portions spanning a rotatable disc and displaced from one another about the periphery thereof, first and second friction pads slidably guided by opposing faces of said two pairs of arm portions of said fixed member into and out of pressing contact with opposite faces, respectively, of said disc, a floating caliper member spanning said disc and both of said pads, mechanically activated press means for acting between said second pad and one end of said caliper member, the improvement wherein said floating caliper member is provided with a hole receiving therein a bolt extending in the axial direction of said disc from one pair of said arm portions of said fixed member, said bolt serving as a main guide for supporting the majority of the weight of said floating caliper during sliding movement of the latter and slidably supporting said floating caliper within a range of sliding movement which is entirely on one side of the disc and includes the center of gravity, in the axial direction of the disc, of the floating caliper, and a pin supporting said caliper member only on said one side of said disc and slidingly fitted in a guide slot running in the axial direction of said disc in the other pair of said arm portions of said fixed member, said guide slot slidably supporting said pin within a range of sliding movement which includes the disc but does not include the center of gravity, in the axial direction of the disc, of the floating caliper.

2. A floating type disc brake as defined in claim 1 wherein said bolt is threaded into said one pair of arm portions.

3. A floating type disc brake as defined in claim 2 wherein said bolt is adjacent to said press means in the circumferential direction of said disc.

4. A floating type disc brake as defined in claim 1 wherein said pin and guide slot are provided outside the circumference of said disc so that said floating caliper member may be rotated thereabout when said bolt is removed from said hole.

5. A floating type disc brake as defined in claim 1 wherein all points within the range of sliding movement of said bolt relative to said hole are spaced apart in the axial direction of said disc from all points within the range of sliding movement of said pin relative to said guide slot whereby a gap α is formed between the respective ranges of sliding movement of said bolt and said pin.

6. A floating type disc brake as defined in claim 5 wherein said pin and guide slot are provided outside the circumference of said disc so that said floating caliper member may be rotated thereabout when said bolt is removed from said hole.

7. A floating type disc brake assembly as defined in claim 1, wherein the center of gravity of the floating caliper member lies in the immediate vicinity of a plane including both said pin and said bolt.

8. A floating type disc brake assembly as defined in claim 1, wherein the pin and bolt are disposed at substantially diametrically opposite sides of said press means.

9. A floating type disc brake as defined in claims 1 or 5, wherein an elastic sleeve is provided between said pin and said guide slot.

* * * * *